United States Patent

[11] 3,631,412

[72] Inventor Philip A. Harding
Palos Verdes Peninsula, Calif.
[21] Appl. No. 6,132
[22] Filed Jan. 27, 1970
[45] Patented Dec. 28, 1971
[73] Assignee Bell Telephone Laboratories, Incorporated
Murray Hill, N.J.

[54] MULTISTATE MAGNETIC CORE MEMORY
9 Claims, 7 Drawing Figs.

[52] U.S. Cl. .......... 340/174 PA, 340/174 M
[51] Int. Cl. .......... G11c 5/02, G11c 11/06, G11c 15/00
[50] Field of Search .......... 340/174 RC, 174 PA, 174 QP, 174 M, 174 GA

[56] References Cited
UNITED STATES PATENTS
3,321,749 5/1967 Overn .......... 340/174 PA

*Primary Examiner*—Bernard Konick
*Assistant Examiner*—Steven B. Pokotilow
*Attorneys*—R. J. Guenther and R. B. Ardis

ABSTRACT: A magnetic core memory wherein states of partial magnetization as well as magnetic saturation are employed. In the course of reading information from a core the core is first switched to one extreme state of magnetization to obtain a data readout pulse and subsequently the core is switched to the opposite state of magnetization to obtain a reference data pulse. The ratio of the magnitudes of the reference pulse and the data pulse is measured and is employed to define the state in which the core resided prior to interrogation. Cores are placed in a stable state either a state of partial magnetization or a state of full magnetization, by switching the core from one extreme state of magnetization to the other extreme state of magnetization to obtain a data reference pulse and subsequently the magnitude of this reference pulse is compared with the magnitude of the data pulse which is generated by the writing of new information into the core. The core drive which is employed for writing is terminated when the ratio between the latter data pulse and the reference data pulse has reached a desired ratio.

*INVENTOR*
*P. A. HARDING*

BY John C Albrecht

*ATTORNEY*

MULTISTATE MAGNETIC CORE MEMORY

BACKGROUND OF THE INVENTION

1. Field of the Invention

This invention is concerned with magnetic core memories wherein states of partial magnetization as well as magnetic saturation are employed. Such memories are capable of storing more than one binary bit of information per core and are, therefore, of interest to digital processing systems. Furthermore, such memories are capable of storing and reproducing analog data signals.

2. Description of the Prior Art

Magnetic core memories are used extensively to store both programs and data for program controlled digital processing systems. Digital data processing systems usually employ binary information signals and the processing circuitry and memories thereof are directed toward the transmission and storage of such binary signals. Magnetic core memories are widely used, and since many digital data processing systems have large memory requirements, the cost per binary bit of information stored in such systems is of extreme importance. Certain prior art magnetic core memories employ cores having a substantially rectangular hysteresis characteristic and the two saturated magnetic states are employed to represent a binary "0" and a binary "1". Such memories comprise one core for each binary bit of information stored in the memory.

Another type of prior art magnetic core memory utilizes one of the saturated states to represent a binary "0" and the demagnetized state to represent a binary "1". In this latter arrangement nondestructive readout of the memory is based on "differential permeability sensing".

Memories of this type also comprise one core for each binary bit of information stored in the memory.

SUMMARY OF THE INVENTION

In accordance with this invention states of core magnetization, in addition to the saturated states, are employed to store information and reference pulses derived from a core in which information is stored, are employed as a reference to distinguish between data pulses representing the states employed and to facilitate writing information into such cores.

It is an object of this invention to increase the information storage capacity of a magnetic core memory.

It is another object of this invention to accurately distinguish data pulses obtained from the interrogation of cores in which a plurality of magnetic states, in addition to the saturated states, are employed and to facilitate accurately creating in such cores states of partial magnetism.

In accordance with one feature of this invention, data signals obtained by interrogation of a magnetic core are processed to determine the ratio between the energy in such data pulses and a reference pulse obtained by subsequently switching the core from one state of saturated magnetization to the other saturated state.

In accordance with another feature of this invention, the ratio information so determined is employed in accurately restoring such magnetic cores to the state of partial magnetization which existed prior to interrogation.

The above and other objects and features of this invention will be more readily understood from the following description when read with respect to the drawing in which:

FIG. 1 is a representation of the hysteresis characteristic of a magnetic core employed in this invention;

FIGS. 2A and 2B, respectively, show coincident current read and write pulses for obtaining information from and for writing information into magnetic cores having a hysteresis characteristic as shown in FIG. 1 and data pulses which occur in response to the application of such read and write pulses to a magnetic core;

DETAILED DESCRIPTION

Figure 1:
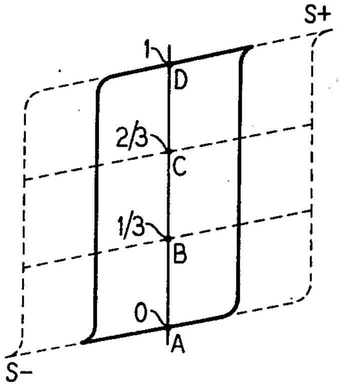

A coincident current magnetic memory employing four stable core states is employed herein for purposes of illustration of the principles of my invention. In FIG. 1 there is shown the hysteresis characteristic of a magnetic core which may be used to advantage in my invention. In this illustrative example each core employs four discrete stable states, namely negative saturation, positive saturation, and two intermediate states of magnetization termed the "⅓" state and the "⅔" state. These states are illustrated in FIG. 1.

Figure 2A:
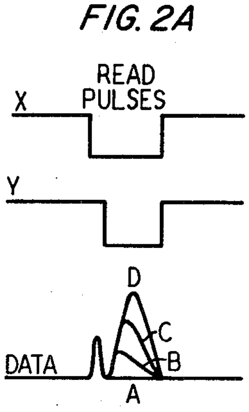

Arrangements for placing a core in these four states will be described after a discussion of FIG. 2A which illustrates the reading of data from such cores. FIG. 2A shows a typical coincident current "read" pulse pair labeled X and Y. The amplitude of each pulse of the pair is such that a single pulse is unable to switch a core. However, the coincidence of the pulses of the pair does effect switching of a core. The X and Y pulses are of equal amplitude, however, the X pulse originates slightly earlier in time than the Y pulse. The X and Y pulses terminate coincidentally. As shown in FIG. 2A a noise pulse occurs coincidentally with the leading edge of the X pulse and this is followed by a data pulse which has an amplitude proportional to the state of magnetization of the interrogated core.

The interrogate pulse pair of FIG. 2A tends to drive the core towards negative saturation (S−) of the core. Accordingly, if the interrogated core was in the "A" state the resulting data pulse will be of zero amplitude. If the interrogated core was in the "B," "C," or "D" states increasing amplitude data pulses (labeled B, C, and D, respectively, in FIG. 2A) will result from application of the interrogate pulse pair. Since the amplitude of the data pulses varies from core to core and since the data pulses resulting from interrogation of a single core vary with temperature and time, it is impossible to establish a standard reference against which to judge the data pulses for the states "B", "C" and "D." The waveforms of the data pulses "B," "C" and "D" are idealized for purposes of illustration only and the actual core output data waveshapes may depart substantially from the idealized waveforms shown. Throughout the remaining FIGS. of the drawing the waveshapes are similarly shown in an idealized form. Advantageously, as will be described later herein, the energy of a data pulse which results from interrogation of a core is temporarily stored as an analog signal and the core is then fully switched from one saturated state to the other saturated state. The data pulse which results from this full switching of the interrogated core is employed as a reference for defining the core state represented by the prior interrogation of the core. Since a reference data pulse is generated each time a core is interrogated, variations in core characteristics due to temperature and to passage of time are effectively eliminated.

Figure 2B:
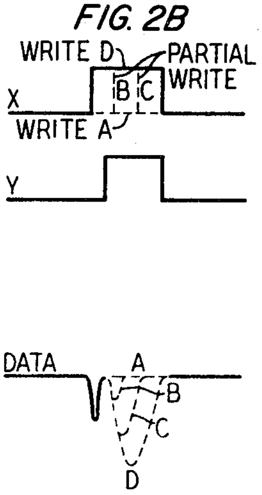

FIG. 2B illustrates a "write pulse pair". In the illustrative example positive X and Y pulses are employed to write new information into the store. The writing pulses are applied to a core after that core has been driven to maximum negative saturation (S−). As in the case of the "read pulse pair" the X pulse originates in time earlier than the Y pulse and, again, neither pulse of the pair is sufficiently large to independently effect switching of the core; however, coincidence of the pulses of the pair drives the core past the lower knee of the hysteresis curve of FIG. 1. Upon initiation of the X pulse a small negative data pulse occurs, and this is followed by a negative going data pulse which is proportional to the change in state effected by the "write pulse pair". As seen in FIG. 2B the duration of the X pulse is based on the information which is to be written into the core. If the core is to be placed in the "A" state, then generation of the X pulse is inhibited as indicated by the line labeled "write A" in FIG. 2B. If the core is to be placed in the "B" or "C" partial magnetized states, the X pulse is generated and terminated as indicated by the dotted lines labeled B and C, respectively, in FIG. 2B. As will be explained later herein, the generation and the duration of the X pulse is controlled in accordance with write control information and in accordance with the ratio of the resulting negative data pulse (shown in FIG. 2B) to a reference data pulse obtained by switching the particular core from one maximum state of saturation to the other maximum state of saturation. Advantageously, since the energy of the X pulse of the "write pulse pair" is related to a reference pulse which is generated immediately prior to the write time variations in core characteristics due to temperature and passage of time are effectively eliminated.

Figure 3:
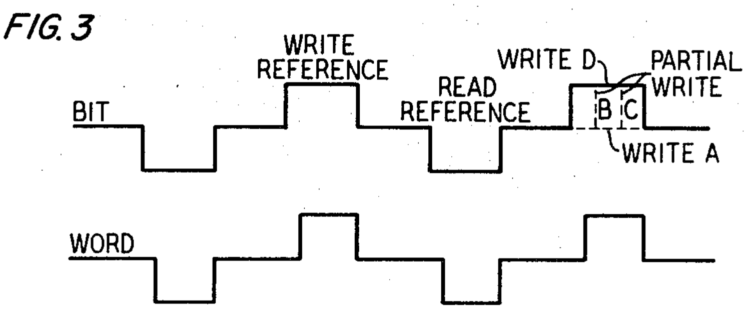
FIG. 3 illustrates a four-pulse read and regenerate sequence as employed in this invention.
Figure 4:
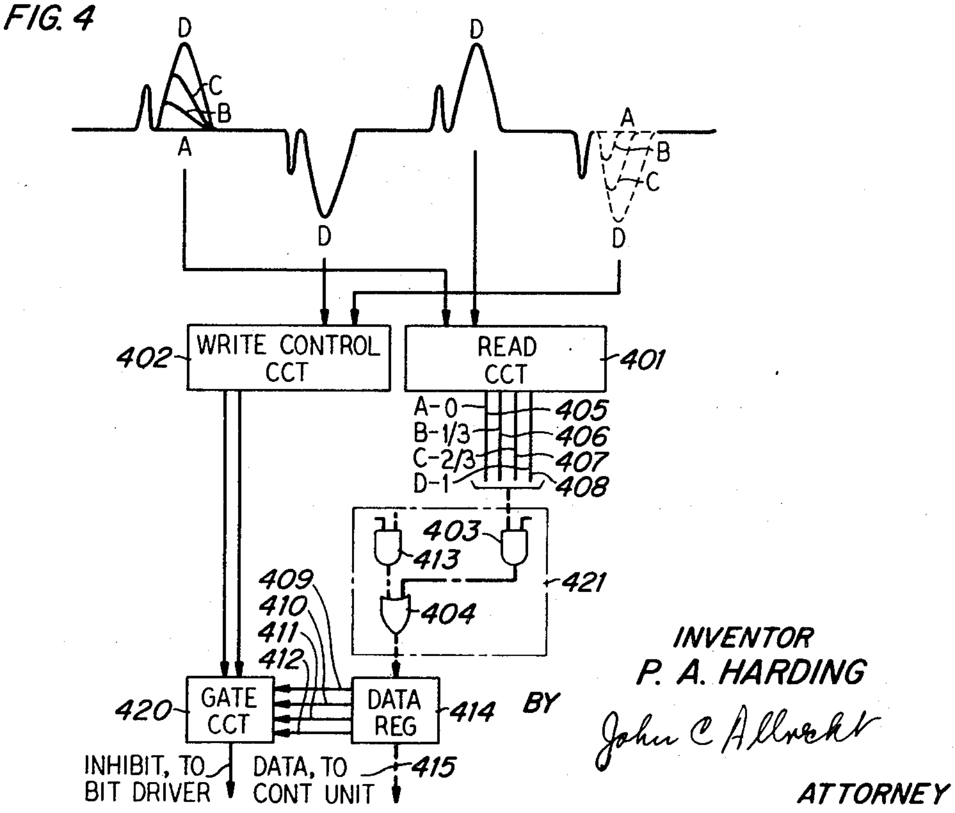
FIG. 4 illustrates the data pulses which occur in response to application of the pulse sequence of FIG. 3 and a general arrangement for utilization of such data.
Figure 6:
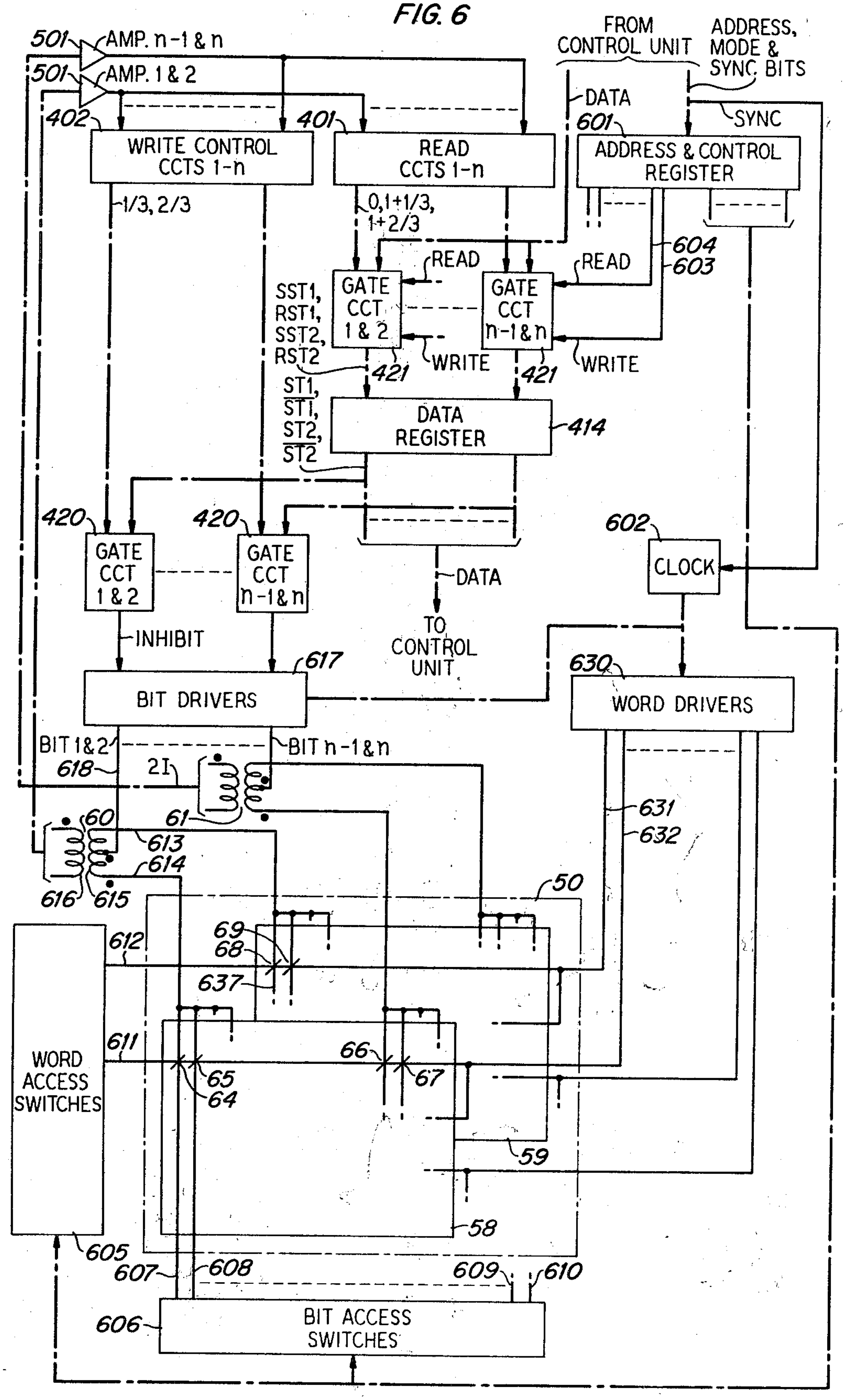
FIG. 6 shows a 2½D magnetic core memory arranged to operate in accordance with the principles of this invention.

A four-pulse sequence for effecting nondestructive readout of a core of the memory of FIG. 6 is shown in FIG. 3. The data pulses which result from application of the pulse pairs of the four-pulse sequence and the utilization of these data pulses is indicated generally in FIG. 4. In the illustrative four-pulse sequence of FIG. 3 negative going pulses tend to drive the illustrative core to the maximum negative state of saturation (S−) while positive going pulse pairs drive the core towards maximum positive saturation S+). As will be explained later with respect to FIG. 6, the coincident current pulses are termed the bit pulse and the word pulse. These correspond in principle to the X and Y pulses of the read and write pulse pairs of FIGS. 2A and 2B. The first (leftmost) pulse pair of FIG. 3 is a "read pulse pair" while the last pair of pulses (the rightmost pair) is a "write pulse pair". The two intermediate pulse pairs serve to derive the previously noted reference pulses which are employed in reading information from and writing information into the memory, respectively. As seen schematically in FIG. 4, the data pulse (having an amplitude equal to A, B, C or D) and the reference data pulse obtained by application of the read reference pulse pair of the sequence are applied to the Read Circuit 401. The Read Circuit 401 serves to generate an output signal on one of the four conductors labeled A, B, C and D in accordance with the ratio of the energy in the read data pulse to the energy in the reference data pulse. The four output conductors of the Read Circuit 401 are connected to a data utilization circuit described later herein and are connected to the Write Control Circuit 402 to control the generation and duration of the bit pulse of the "write pulse pair".

The reference data pulse obtained by application of the write reference data pulse pair (the second pulse pair of the four-pulse sequence) is also applied to the Write Control Circuit 402. The data pulse which results from application of the write pulse pair of the sequence (the fourth pulse pair of the sequence) is applied as another input to the Write Control Circuit 402. The function of the Write Control Circuit 402 is to terminate the bit write pulse at a time dictated by the information which is to be written into the core. In the case of nondestructive readout, the information which is written into the core corresponds to the information previously stored in the core. Accordingly, the output information signals obtained from the Read Circuit 401 are gated through the And-gate 403 and the OR-gate 404 and are applied as control signals to the Data Register 414. The output of the Data Register 414 is applied to the Gate Circuit 420. There is a one-for-one correspondence between the Control Conductors 409 through 412 of the Write Control Circuit 402 and the Output Conductors 405 through 408 of the Read Control Circuit 401. New information can be gated to the Data Register 414 via the AND-gate 413 when the store is being operated in the "write" mode or in the "read and change" mode. The Write Control Circuit 402 compares the energy in the write reference data pulse and the energy in the write data pulse and generates an inhibit signal on Conductor 416 when the energy in the latter pulse has reached a level dictated by a signal on one of the Control Conductors 409 through 412. For example, if a core, upon interrogation by application of the read pulse pair, is found to be in the "A" state, then the Write Control Circuit 402 and the Gate Circuit 420 will inhibit generation of the bit pulse of the write pulse pair. If the core, upon interrogation by application of the read pulse pair, is found to be in the "B" state, then the Write Control Circuit 402 and the Gate Circuit 420 will generate an inhibit signal to terminate the bit pulse of the write pulse pair when the energy in the write data pulse has approached the amplitude B shown in FIG. 4. Similarly, if the core, upon interrogation by application of the read pulse pair, is found to be in the "C" state, an inhibit signal will be generated to terminate the bit write pulse and if the core, upon interrogation, is found to be in the "D" state, the inhibit signal will not be generated and the bit write pulse will terminate coincidentally with the word write pulse. In the above discussion it is indicated that the inhibit signal is generated when the write data pulse approaches the level dictated by the control signal on the Conductors 409 through 412. The precise time at which the inhibit pulse is generated takes into account the reaction time of the Write Control Circuit 402 and of the bit driver circuit so that the write pulse pair brings the core to the desired partial state e.g., "⅓").

Figure 5:
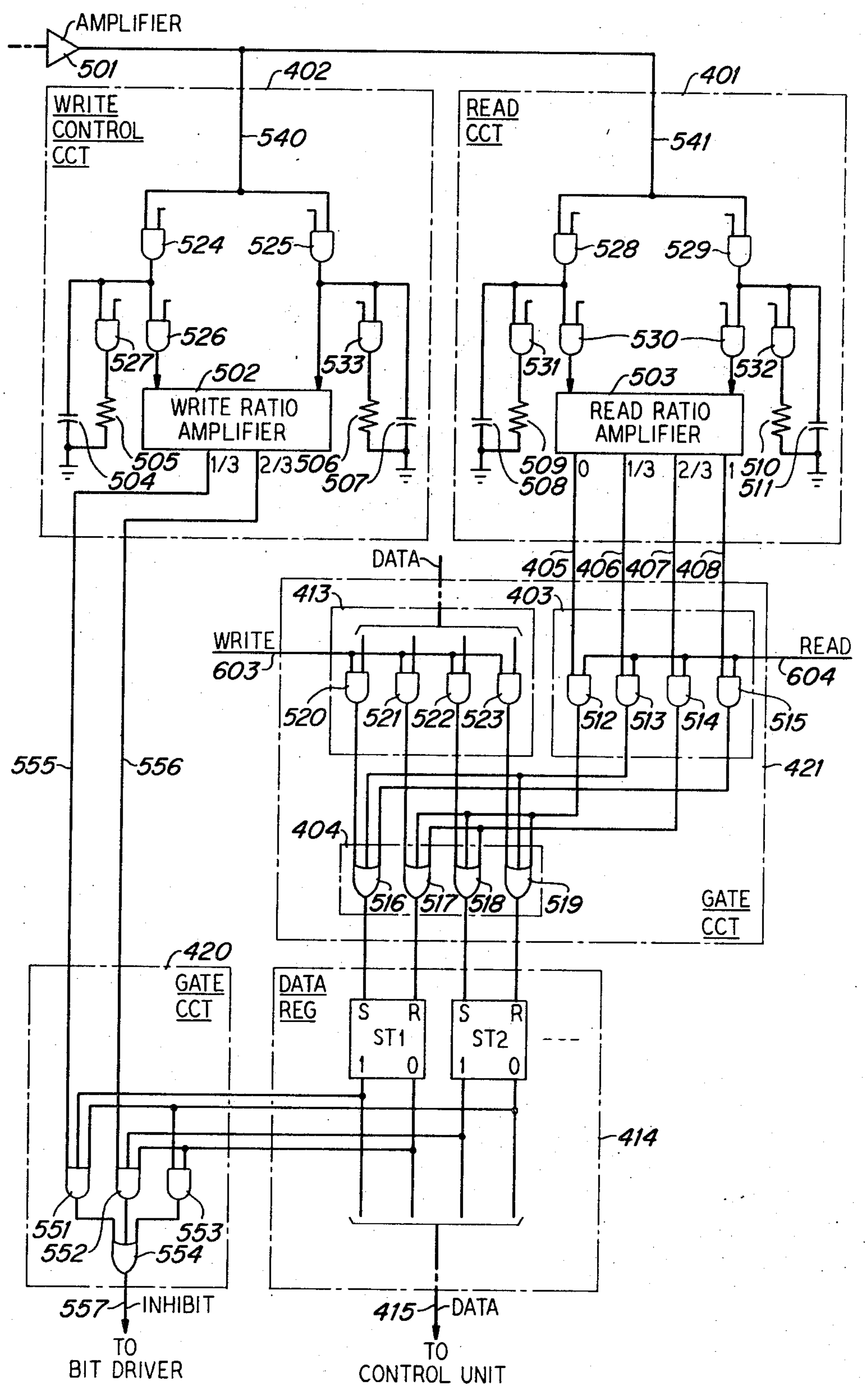
FIG. 5 is a more detailed schematic of the data utilization circuits.

The Write Control Circuit 402, the Read Circuit 401, the Data Register 414, and the related gates are shown in FIG. 5. The circuit arrangement shown in FIG. 5 serves two binary bits which are obtained from a single core. Accordingly, these arrangements are repeated for each two binary bits of the memory word. For example, if the memory contains 12 cores per output word, the arrangements of FIG. 5 are repeated 12 times and the memory output word comprises 24 binary bits.

Data signals obtained from a core are transmitted to the Write Control Circuit 402 and to the Read Circuit 401 via the Amplifier 501 and the Conductors 540 and 541.

The control signals for the gates of the Write Control Circuit 402 and the Read Circuit 401 are generated by a memory control circuit which is not shown. These control signals are coordinated with the various interrogate, reference and write pulse pairs such as are shown in FIG. 3.

Upon occurrence of the "read" pulse pair, the clamping gate 531 is disabled and gate 528 is enabled to gate the resulting data signal to the Capacitor 508 where the energy in the pulse is held until the read reference pulse is available. At the occurrence of the "Write reference" pulse pair, which immediately succeeds the "read" pulse pair in time, the clamping gage 527 is disabled and the gate 524 is enabled to gate the write reference data pulse to the Capacitor 504 where the energy in the pulse is held until it is to be compared with the "-write" data pulse.

The "read reference" pulse pair immediately follows the "-write reference" pulse pair in time and serves to generate the "read reference" data signal. This data signal is gated to the Capacitor 511 via AND-gate 529. The clamping gate 532 is disabled just prior to the enabling of gate 529. Shortly after receipt of the read reference data signal the gates 530 are enabled to gate the data stored in the Capacitors 508 and 511 to the Read Ratio Amplifier 503. This amplifier circuit compares the two applied signals and generates a corresponding output signal on the Conductors 405 through 408. At an appropriate time after the Read Ratio Amplifier 503 has settled, the gates 512 through 515 are enabled to gate the output signal of the Read Ratio Amplifier 503 to the input conductors of the Data Register 414. The gates 512 through 515 and the connections to the OR-gates 517 through 519 comprise a translator circuit which converts signals on the four Conductors 405 through 408 to signals to the set and reset terminals of the register stages ST1 and ST2 of the Data Register 414. The register stage ST1 is the least significant bit while the register stage ST2 is employed to store the most significant bit of the two-bit byte. For example, a signal on the "0 Conductor" 405 is transmitted through AND-gate 512 and the OR-gates 517 and 519 to reset both register stages. A signal on the "⅓" Conductor 406 is transmitted through AND-gate 513 and the OR-gates 516 and 519 to set the register stage ST1 and to reset the register stage ST2. Similarly a signal on the "⅔" Conductor 407 serves to reset stage ST1 and to set stage ST2 while a signal on the "1" Conductor 408 serves to set both stages of the Data Register 414.

The information in the Data Register 414 serves the following purposes: (a) It is transmitted to the control unit where it is employed for subsequent data processing, and (b) it is employed in the regeneration of the information in the previously interrogated core. The output conductors of the stages of the Data Register 414 are transmitted to the control unit via the Conductor Group 415 and are transmitted to the gates 551 through 553 of the Gate Circuit 420. Accordingly, prior to the occurrence of the write pulse pair of FIG. 3, the data obtained by interrogation of the core has settled in the stages ST1 and ST2 of the Data Register 414 and the contents thereof are available for controlling the gates 551 through 553 which are employed to generate the inhibit signal at the output of the OR-gate 554.

Immediately prior to initiation of the write pulse pair, the AND-gate 525 is enabled to gate the data pulse which results from application of the write pulse pair to the Write Ratio Amplifier 502. At the same time gate 526 is enabled to gate the information stored on Capacitor 504 to the Write Ratio Amplifier 502. As seen in FIG. 5, the Write Ratio Amplifier 502 has two output conductors, namely the "⅓" Conductor 555 and the "⅔" Conductor 556. There are no conductors corresponding to the other two stable states of magnetization, namely the "0" state and the "1" state since such information is not required for effecting generation of the inhibit signals on Conductor 557. As seen in FIG. 2B and in FIG. 3, when the information stored in the Data Register 414 corresponds to the "A" state of FIG. 1 the bit pulse of the write pulse pair is not generated. An examination of the gates 551 through 554 of FIG. 5 shows that an inhibit pulse is generated when the register stages ST1 and ST2 of the Data Register 414 are both in the "0" state. Under this condition the gate 553 is enabled which serves to generate an inhibit signal on Conductor 557. The gate 551 is enabled when the register stage ST1 is in the "1" state and the register stage ST2 is in the "0" state. Similarly, the gate 552 is enabled when the register stage ST1 is in the "0" state and the register stage ST2 is in the "1" state. The output signals on the "⅓" and "⅔" Conductors 555 and 556 occur slightly in advance of the time that the resulting data pulse reaches the "⅓" and the "⅔" states, respectively, since there is a slight time delay involved in cutting off the bit pulse of the write pulse pair. In the event that the data stored in the Data Register 414 represents the "D" state of FIG. 1, the bit write pulse is permitted to occur for the full pulse period since the core is to be restored to the fully saturated "D" state.

The application of the principles of this invention to a word organized memory is shown in FIG. 6. This memory is passive in the absence of accessing signals from the control unit. However, the internal timing of operations within the memory is independent of the absolute timing of functions within the control unit. The accessing command from the control unit comprises a memory address portion, a mode portion which specifies reading or writing, a synchronizing portion, and in the case of a write command a data portion. The address and mode portions of the command are transmitted to the Address and Control Register 601 and the synchronizing portion serves to initiate operation of the Clock 602. The date portion of a write accessing command is transmitted to the Data Register 414 through the Gate Circuit Arrangement 421 under control of the write signal on Conductor 603. The Gate Circuit Arrangement 421 of FIG. 6 corresponds to the Gate Circuit Arrangement 421 of FIGS. 4 and 5. Similarly, the Write Control Circuit 402, the Read Control Circuit 401, the Data Register 414, and the Gate Circuit 420 of FIG. 6 correspond in function to the similarly numbered elements of FIGS. 4 and 5.

The memory of FIG. 6 is accessed by the Word Access Switches 605 and the Bit Access Switches 606. The address portion of the accessing command which resides in a portion of the Address and Control Register 601 is employed in the control of the Word and Bit Switches 605 and 606.

The memory cores of FIG. 6 are organized in groups of words on the planes such as 58 and 59. Core 64 is the first core of one group while core 66 is the last core of the same group. Similarly, core 65 is the first core of a second group and core 67 is the last core of that second group. The remaining cores of these two groups and of the remaining groups are not shown in FIG. 6. The cores of a group correspond to the elements of a word in the memory. The particular group of cores which is addressed is selected by means of output conductors of the Bit Access Switches 606. Bit pulses are transmitted on all of the output lines of the Bit Drivers 617 and a group of cores is selected by the Bit Access Switches 606. The Bit Drivers 617 produce output signals of double current value on output conductors such as 618. The current on Conductor 618 splits evenly between the Conductors 613 and 614. The Bit Access Switches 606 serve to terminate the conductors of both the plane 58 and the plane 59. For example, if the Conductor 637 is terminated by the Bit Access Switches 606 the Conductor 637 which is associated with the plane 59 will also be terminated or selected by the Bit Access Switches 606.

The Word Access Switches 605 serve to select a particular row of a particular plane. The Word Drivers 630 generate current signals on the Conductors 631 and 632 and these conductors are selectively terminated by the Word Access Switches 605 in accordance with address information contained in the Address and Control Register 601. By these arrangements a row of either the front plane 58 or the rear plane 59 is selected and the bit currents flowing through the lines of the unselected plane have no effect on the cores of the unselected plane.

Because of the way in which the windings 615 and 616 of the Transformer 60 are connected, the bit current which splits evenly between the Conductors 613 and 614 will not generate a substantial output signal in the winding 616. However, when the bit current and the word current are coincidentally applied to a core the output signals generated by the switching of a core will appear as a signal on the bit line conductors such as 614 and 613. This output current, which is representative of the data read from a core flows through both halves of the winding 615 in the same direction. There is a direct path between the Conductor 607 and the Conductor 637 through the Bit Access Switches 606 when activated and the current through the two halves of winding 615 will generate an output signal in the winding 616 to thus produce an input to one of the Amplifiers 501.

The remaining operation of the memory of FIG. 6 proceeds as described above with respect to FIGS. 4 and 5.

The foregoing description illustrates the principles of my invention and it is clear to one skilled in the art that these principles may be utilized with cores employing additional stable states and in a memory which is organized differently from the memory shown in FIG. 6.

What is claimed is:

1. The method of nondestructively reading information from a magnetic core having at least three stable states, said information being represented by $n$ of said stable states comprising the steps of:

a. applying an interrogate signal to an interrogate winding of the core, said interrogate signal being of sufficient magnitude to switch the core from a present remanent state to a first state of saturation;

b. storing a data pulse which occurs at an output winding of said core in response to the switching of said core in step (a);

c. applying a second interrogate signal to said interrogate winding of said core, said second interrogate signal being of sufficient magnitude to switch said core to a second saturated state;

d. storing a reference data pulse which occurs at said output winding of said core in response to the switching of said core in step (c);

e. determining the ratio of the magnitudes of said first data pulse obtained by step (a) and said reference data pulse obtained by step (c) and in accordance with the determined ratio energizing a corresponding one of $n$ conductors corresponding to said $n$ stable states;

f. applying a write signal to said interrogate winding of said core to switch core to a desired remanent state corresponding to the state represented by the conductor energized in step (e);
g. determining the ratio of the magnitudes of a data pulse which occurs at said output winding of said core during step (f) and said stored reference data pulse; and
h. terminating said write signal when the ratio determined in step (g) attains a value corresponding to the value represented by the output conductor energized in step (e).

2. The method of reading information from a magnetic core having at least three stable states, said information being represented by *n* of said stable states comprising the steps of:
a. applying an interrogate signal to an interrogate winding of the core, said interrogate signal being of sufficient magnitude to switch the core from a present remanent state to a first state of saturation;
b. storing a data pulse which occurs at an output winding of said core in response to the switching of said core during step (a);
c. applying a second interrogate signal to said interrogate winding of said core, said second interrogate signal being of sufficient magnitude to switch said core to a second saturated state;
d. storing a reference data pulse which occurs at said output winding of said core in response to said switching of said core during step (c);
e. determining the ratio of the magnitudes of said stored data pulse obtained by step (a) and said stored reference data pulse obtained in step (c) and in accordance with the determined ratio energizing a corresponding one of *n* corresponding to said *n* stable states.

3. The method of reading information from a magnetic core having at least three stable states, said information being represented by *n* of said stable states comprising the steps of:
a. applying an interrogate signal to an interrogate winding of the core, said interrogate signal being of sufficient magnitude to switch the core from a present remanent state to a first state of saturation;
b. storing a data pulse which occurs at an output winding of said core in response to the switching of said core during step (a);
c. applying a second interrogate signal to said interrogate winding of said core, said second interrogate signal being of sufficient magnitude to switch said core to a second saturated state; and
d. determining the ratio of the magnitudes of said stored data pulse obtained by step (a) and said reference data pulse obtained in step (c) and in accordance with the determined ratio energizing a corresponding one of *n* conductors corresponding to said *n* stable states.

4. The method of nondestructively reading information from a magnetic core having at least three stable states, said information being represented by *n* of said stable states comprising the steps of:
a. applying an interrogate signal to an interrogate winding of the core, said interrogate signal being of sufficient magnitude to switch the core from a present remanent state to a first state of saturation;
b. storing a data pulse which occurs at an output winding of said core in response to the switching of said core in step (a);
c. applying a second interrogate signal to said interrogate winding of said core, said second interrogate signal being of sufficient magnitude to switch said core to a second saturated state;
d. storing a reference data pulse which occurs at said output winding of said core in response to the switching of said core in step (c);
e. applying a third interrogate pulse to said interrogate winding of said core, said third interrogate pulse being of sufficient magnitude to switch said core from said second saturated state to said first saturated state;
f. determining the ratio of the magnitudes of said first data pulse obtained by step (a) and a reference pulse which occurs at said output winding of said core in response to the switching of said core in step (e) and in accordance with the determined ratio energizing a corresponding one of *n* conductors corresponding to the *n* stable states;
g. applying a write signal to said interrogate winding of said core to switch said core to a desired remanent state corresponding to the state represented by the conductor energized in step (f);
h. determining the ratio of the magnitudes of a data pulse which occurs at said output winding of said core during step (g) and said reference data pulse; and
i. terminating said write signal when the ratio determined in step (g) attains a value corresponding to the value represented by the output conductor energized in step (f).

5. The method of writing information into a magnetic core having at least three stable states, said information being represented by *n* of said stable states, the method comprising the steps of:
a. applying an interrogate signal to an interrogate winding of the core, said interrogate signal being of sufficient magnitude to switch the core to a first state of saturation;
b. applying a second interrogate signal to said interrogate winding of said core, said second interrogate signal being of sufficient magnitude to switch said core to a second saturated state;
c. storing a reference data pulse which occurs at the output winding of said core in response to the switching of said core in step (b);
d. applying a write signal to said interrogate winding of said core to switch said core to a desired remanent state corresponding to a state represented by an energized one of *n* data input conductor corresponding to said *n* stable states;
e. determining the ratio of magnitudes of a data pulse which occurs at said output winding of said core during step (d) and said stored data pulse; and
f. terminating said write signal when the ratio determined in step (e) attains a value corresponding to the value represented by an energized one of the *n* data input conductors.

6. The method of writing information into a magnetic core having at least three stable states, said information being represented by *n* of said stable states, the method comprising the steps of:
a. applying an interrogate signal to an interrogate winding of the core, said interrogate signal being of sufficient magnitude to switch the core to a first state of saturation;
b. applying a second interrogate signal to said interrogate winding of said core, said second interrogate signal being of sufficient magnitude to switch said core to a second saturated state;
c. storing a reference data pulse which occurs at the output winding of said core in response to the switching of said core in step (b);
d. applying a third interrogate pulse to said interrogate winding of said core, said third interrogate pulse being of sufficient magnitude to switch said core from second saturated state to said first saturated state;
e. applying a write signal to said interrogate winding of said core to switch said core to a desired remanent state corresponding to the state represented by an energized one of an *n* data input conductor corresponding to said *n* stable states;
f. determining the ratio of the magnitudes of a data pulse which occurs at said output winding of said core during step (e) and said stored data pulse; and
g. terminating said write signal when the ratio determined in step (f) attains a value corresponding to the value represented by an energized one of the *n* data input conductors.

7. A circuit arrangement for nondestructively reading information from a magnetic core having at least three stable states, said information being represented by $n$ of said stable states comprising:

a plurality of windings associated with and coupled to said core, said windings comprising at least an interrogate winding and an output winding;

means connected to said interrogate winding for generating and applying a sequence of interrogate pulses, said pulse sequence comprising a data readout pulse, a write reference pulse, a read reference pulse, and a write pulse;

first ratio determining circuit means for determining the ratio of the magnitude of a read data pulse which occurs on said output winding in response to the application of said data readout pulse to the magnitude of a read reference data pulse which occurs on said output winding in response to the application of said read reference pulse, said ratio determining circuit means comprising means for energizing one of $n$ conductors in accordance with the determined ratio, said $n$ conductors corresponding to said $n$ stable states;

means for controlling the duration of said write pulse, said controlling means comprising second ratio determining circuit means for determining the ratio of the magnitude of a write data pulse which occurs on said output winding in response to the application of said write pulse to the magnitude of a write reference data pulse which occurs on said output winding in response to the application of said write reference pulse, said second ratio determining circuit means comprising means to terminate said write pulse when the ratio of said data pulses applied thereto corresponds to the stable state represented by the energized one of said $n$ output conductors of said first ratio determining circuit.

8. A circuit arrangement for reading information from a magnetic core having at least three stable states, said information being represented by $n$ of said stable states comprising:

a plurality of windings associated with and coupled to said core, said windings comprising at least an interrogate winding and an output winding;

means connected to said interrogate winding for generating and applying a sequence of interrogate pulses, said pulse sequence comprising a data readout pulse and a read reference pulse;

ratio determining circuit means for determining the ratio of the magnitude of a read data pulse which occurs on said output winding in response to the application of said data readout pulse to the magnitude of a read reference pulse which occurs on said output winding in response to the application of said read reference pulse, said ratio determining circuit means comprising means for energizing one of $n$ conductors in accordance with the determined ratio, said $n$ conductors corresponding to said $n$ stable states.

9. A circuit arrangement for writing information into a magnetic core having at least three stable states, said information being represented by $n$ of said stable states comprising:

a plurality of windings associated with and coupled to said core, said windings comprising at least a drive winding and an output winding;

means connected to said drive winding for generating and applying a sequence of drive pulses, said pulse sequence comprising a write reference pulse and a write pulse;

a plurality of data input conductors corresponding to said $n$ state states, means for energizing said data input conductors to define the information to be written into said core; and means for controlling the duration of said write pulse, said controlling means comprising ratio determining circuit means for determining the ratio of the magnitude of a write data pulse which occurs on said output winding in response to the application of said write pulse to the magnitude of a write reference data pulse which occurs on said output winding in response to the application of said write reference pulse, said ratio determining circuit means comprising means to terminate said write pulse when the ratio data pulses applied thereto corresponds to the stable state represented by said data input conductors.

* * * * *

UNITED STATES PATENT OFFICE
CERTIFICATE OF CORRECTION

Patent No. 3,631,412 Dated December 28, 1971

Inventor(s) Philip A. Harding

It is certified that error appears in the above-identified patent and that said Letters Patent are hereby corrected as shown below:

Column 4, line 42, "gage" should read --gate--. Column 5, line 58, "date" should read --data--. Column 7, line 2, after "switch" insert --said--. Column 7, line 32, after "n" insert --conductors--. Column 8, line 60, after "from" insert --said--. Column 10, line 37, after "ratio" insert --of said--.

Signed and sealed this 4th day of July 1972.

(SEAL)
Attest:

EDWARD M.FLETCHER, JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334